US007630800B2

United States Patent
Hirano et al.

(10) Patent No.: US 7,630,800 B2
(45) Date of Patent: Dec. 8, 2009

(54) FAILURE SENSING DEVICE OF VEHICLE CONTROL SYSTEM

(75) Inventors: Hiroyuki Hirano, Toyota (JP); Ryo Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 325 days.

(21) Appl. No.: 10/577,909

(22) PCT Filed: Jan. 4, 2005

(86) PCT No.: PCT/JP2005/000163

§ 371 (c)(1),
(2), (4) Date: May 1, 2006

(87) PCT Pub. No.: WO2005/068262

PCT Pub. Date: Jul. 28, 2005

(65) Prior Publication Data

US 2007/0156310 A1    Jul. 5, 2007

(30) Foreign Application Priority Data

Jan. 19, 2004    (JP) .............................. 2004-010383

(51) Int. Cl.
   *G06F 17/00*    (2006.01)
   *G01M 19/00*    (2006.01)
   *G01R 31/00*    (2006.01)
(52) U.S. Cl. .............................. 701/29; 701/33; 714/736
(58) Field of Classification Search .................. 701/1,
   701/29, 31, 33, 34, 36, 39, 43, 62, 63, 76,
   701/92, 97, 114; 700/21, 79; 714/736; 340/438,
   340/439
   See application file for complete search history.

(56) References Cited

U.S. PATENT DOCUMENTS

| 5,957,985 | A | 9/1999 | Wong et al. |
| 5,987,365 | A | 11/1999 | Okamoto |
| 2001/0041956 | A1* | 11/2001 | Wong et al. .................... 701/36 |
| 2003/0009271 | A1* | 1/2003 | Akiyama ...................... 701/33 |
| 2003/0023407 | A1* | 1/2003 | Loehr et al. .................. 702/186 |
| 2003/0131490 | A1* | 7/2003 | Johansson et al. ............. 33/608 |
| 2003/0151490 | A1* | 8/2003 | Gross et al. .................. 340/3.1 |

FOREIGN PATENT DOCUMENTS

| GB | 1 587 304 | 4/1981 |
| JP | A-04-041960 | 2/1992 |
| JP | A 06-174599 | 6/1994 |
| JP | A-07-329701 | 12/1995 |
| JP | A-09-151780 | 6/1997 |

(Continued)

*Primary Examiner*—Edward Pipala
(74) *Attorney, Agent, or Firm*—Oliff & Berridge, PLC

(57) ABSTRACT

A vehicle control system is configured by basic control units of a power train control unit, a steering control unit and a brake control unit that are arranged in a lower control hierarchy level, a vehicle motion control manager unit that is arranged in a middle control hierarchy level, and a driving support control unit that is arranged in an upper control hierarchy level. The basic control units transmits input data to vehicle motion control manager unit of middle control hierarchy level and/or driving support control unit of upper control hierarchy level, and receives a calculation result of the input data substituted into a predetermined calculation formula at vehicle motion control manager unit and/or driving support control unit. If the input data and the calculation result data are not consistent, it determines that there is a failure in vehicle motion control manager unit and/or driving support control unit.

18 Claims, 3 Drawing Sheets

FOREIGN PATENT DOCUMENTS

| | | |
|---|---|---|
| JP | A 2000-156685 | 6/2000 |
| JP | A-2000-166016 | 6/2000 |
| JP | A 2003-019931 | 1/2003 |
| JP | A-2003-046536 | 2/2003 |
| JP | A-2003-076582 | 3/2003 |
| JP | A 2003-137047 | 5/2003 |
| JP | A 2003-191774 | 7/2003 |
| KR | 1997-0065096 | 10/1997 |
| KR | 1999-0049096 | 7/1999 |
| SU | 1 087 389 A | 4/1984 |

* cited by examiner

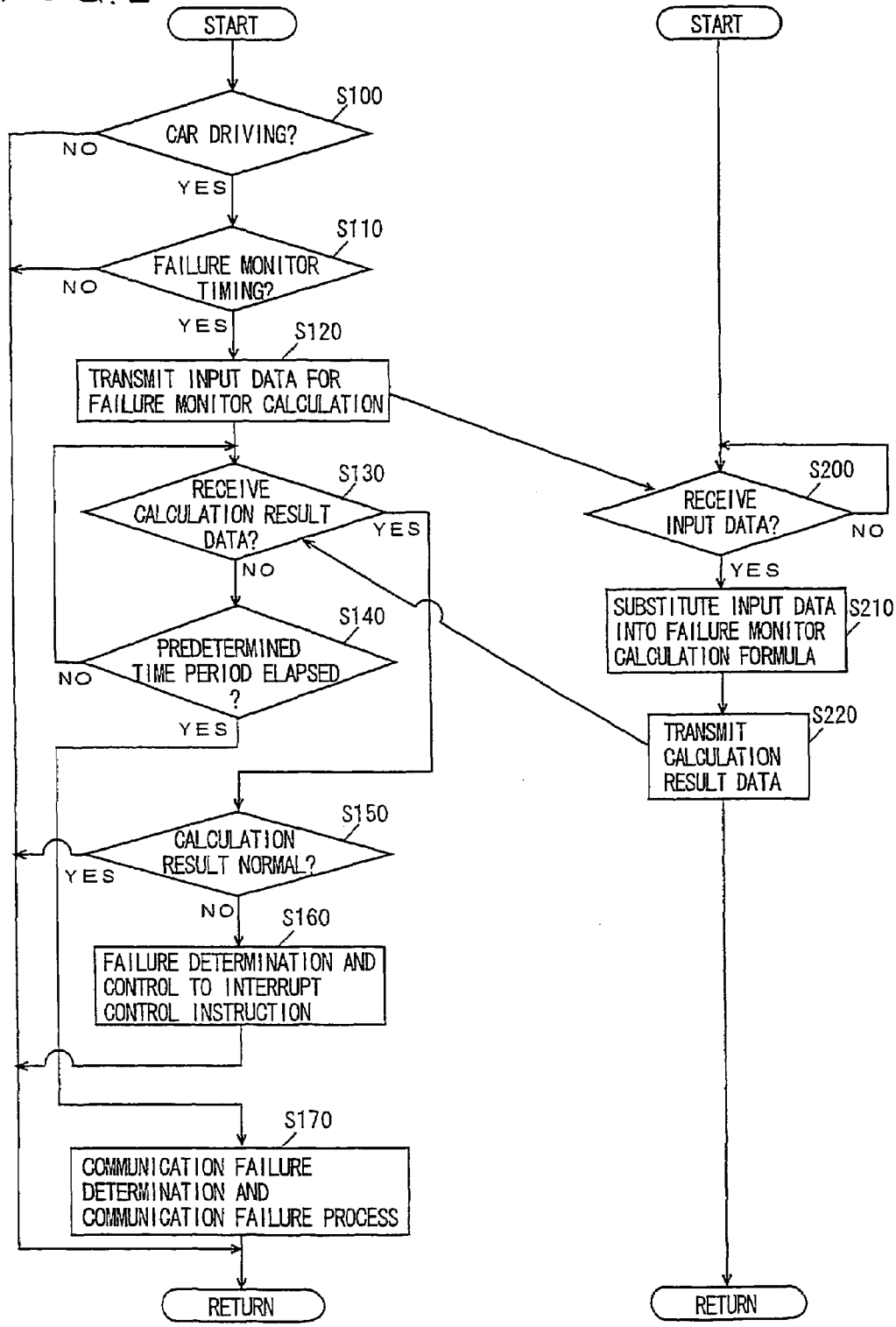

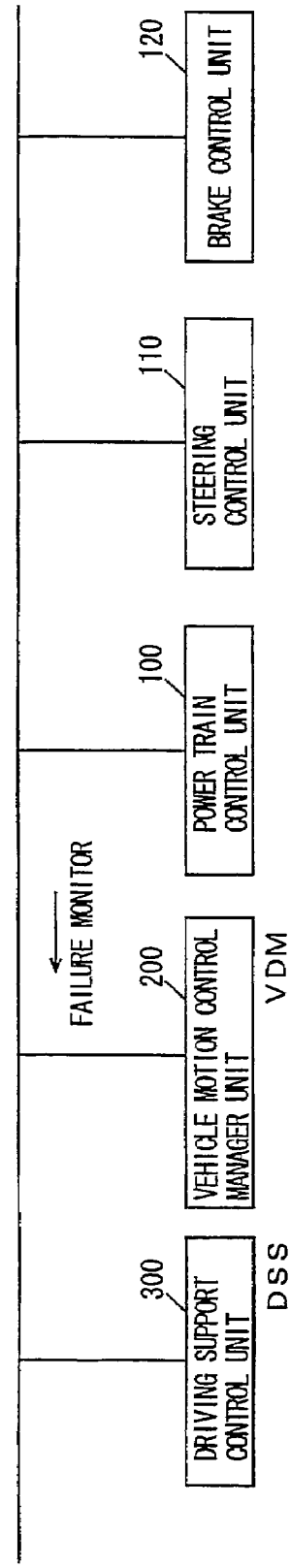

FAILURE SENSING DEVICE OF VEHICLE CONTROL SYSTEM

TECHNICAL FIELD

The present invention relates to a vehicle control system, and particularly to a failure sensing technique in a control system in which a plurality of control computers are connected through a network.

BACKGROUND ART

Recently, high-performance microprocessors have been developed, and a computer unit (ECU (Electronic Control Unit)) including many microprocessors has been incorporated into a vehicle such as an automobile. The ECUs are for pursuing driving performance, safety, comfort, resource saving, energy saving and the like, and they are incorporated into a vehicle for controlling its power train system, body system, safety system, information system and the like.

There are ECUs respectively controlling an engine, a brake, a steering device, a suspension, and a transmission as a vehicle motion system (an ECU may integrally control part of or all of them), ECUs respectively controlling a power door, a power seat, an air conditioner, and an illumination as a body system, ECUs respectively controlling an air bag and collision sensor as a safety system, and ECUs respectively controlling a car navigation device and car audio device as an information system. An in-vehicle network has been employed for reducing the wire harnesses involved with an increase in the number of ECUs.

In a vehicle control system constituted by ECUs connected to such an in-vehicle network, a power train system ECU corresponding to a "running" operation that is the basic operation of the vehicle, a brake system ECU corresponding to a "stop" operation, and a steering system ECU corresponding to a "turning" operation are provided operable in a manner independent of each other. In addition to these basic control units, a processing unit is applied such that the driving operation corresponding to the vehicle environment, driving support for the driver, and vehicle dynamic motion control can be conducted automatically in a parallel manner. These processing unit and basic control units may be configured with an upper-lower level relationship, or without constituting an upper-lower level hierarchy.

In such a vehicle control system, a failure occurring in one of many ECUs must be accurately sensed, or various problems may be invited. Accordingly, a failure detection program for detecting a failure in each part of a vehicle has been incorporated into a vehicle in order to improve the reliability. Specifically, it is for automatically checking the operation status of a computer portion, sensors or the like by an appropriate cycle, and storing diagcode or the like upon failure. Thus, a maintenance man reads the diagcode or the like stored in the electronic control unit by connecting a dedicated tool, and specifies the location of the failure.

Japanese Patent Laying-Open No. 2003-019931 (Document 1) discloses a failure diagnosis system that permits appropriate determination of a problem caused by a cooperative operation of a plurality of electronic control units connected through an in-vehicle network, and an immediate specification of the location of a failure. The failure diagnosis system includes a plurality of electronic control units connected through an in-vehicle network and having a failure detection program for detecting a failure of a vehicle in controlling a control target, and a vehicle management device communicating with the electronic control units through the in-vehicle network to perform a vehicle failure management. The vehicle management device includes: problem determination means for determining an occurrence of a problem based on data of an electronic control unit passed through the in-vehicle network; program obtain means for obtaining a test diagnosis program prepared in advance corresponding to the problem when the occurrence of the problem is determined by the problem determination means; failure location specification means for executing the test diagnosis program obtained by the program obtain means, thereby causing a corresponding electronic control unit to perform an addressing process, and thereby specifying the failure location based on information transmitted from the electronic control unit; and information output means for outputting failure information related to the failure based on a process result by the failure location specification means.

According to the failure diagnosis system, since an occurrence of a problem is determined based on data of an electronic control unit passed through a network, an occurrence of a problem related to the cooperative operation among the electronic control units can also be determined. Additionally, since a test diagnosis program prepared in advance is used and the failure location is specified by causing the applicable electronic control unit to transmit an internal variable in specific control, for example, it is highly possible that the failure location is specified immediately.

On the other hand, according to the disclosure of Document 1, the vehicle manager ECU monitors data of respective ECUs on the in-vehicle network and determines a failure. In other words, it determines a problem related to the cooperative control among the ECUs from failure detection result data by a failure detection program executed at each ECU, and data exchanged among the ECUs through the vehicle manager ECU. The vehicle manager ECU obtains a test diagnosis program corresponding to the problem from a client server, executes the obtained test diagnosis program thereby causes the corresponding ECU to perform an addressing process, and specifies the failure location by causing the corresponding ECU to transmit an internal variable in specific control or the like, for example. Therefore, the vehicle manager ECU must be implemented with a function as an original vehicle management device in addition to a function of monitoring numerous ECUs. Thus, the calculation load of the vehicle manager ECU increases, and the ECU requires a computer that is highly reliable, capable of high-speed calculation and with high performance. Such an ECU is expensive, and therefore increases the costs. Furthermore, centralizing the functions to the vehicle manager ECU, when there is a failure (including a failure due to high load, a failure due to a hardware trouble and the like) in the vehicle manager ECU, functions of the power train system ECU corresponding to a "running" operation that is the basic operation of the vehicle, the brake system ECU corresponding to a "stop" operation, and the steering system ECU corresponding to a "turning" operation, which are managed by the vehicle manager ECU, may be weakened.

DISCLOSURE OF THE INVENTION

The present invention has been made to solve the problems described above, and an object thereof is to provide a failure sensing device of a vehicle control system that can, when sensing a failure occurring in a calculation unit (ECU) connected through a network, accurately sense the failure without incurring undue load concentration.

A failure sensing device according to the present invention senses a failure in a vehicle control system including a control unit generating a control target based on an operation request for controlling a running state of a vehicle by manipulating a corresponding actuator using the generated control target, and a processing unit connected to the control unit by a network, for generating and providing to the control unit additional information to be used to modify the operation request or the control target, as necessary, at the control unit. The failure sensing device is provided to the control unit, and includes an output portion outputting information to the processing unit, a receiving portion receiving a response corresponding to the information from the processing unit, and a sensing portion sensing a failure in the processing unit based on the information and the response.

According to the present invention, for example in a hierarchically configured vehicle control system in which a processing unit is arranged in an upper hierarchy level and a control unit is arranged in a lower hierarchy level and/or in a vehicle control system in which a processing unit and a control unit are arranged not hierarchically but in parallel, a failure in the processing unit can be sensed from the control unit. In the vehicle control system, a processing unit with advanced functions for supporting driving of the driver and for controlling the dynamic state of the vehicle, a power train system control unit corresponding to a "running" operation that is the basic operation of the vehicle, a brake system control unit corresponding to a "stop" operation, and a steering system control unit corresponding to a "turning" operation are provided. These control units, which share functions so that respective control loads are small, sense a failure in the processing unit. Thus, calculation load in the processing unit with advanced functions can be suppressed. For example, in a case of a control system having upper-lower hierarchy, since the failure sensing function is shared by a plurality of control units of lower hierarchy level, calculation load in a processing unit of upper hierarchy level can be suppressed. Further, it is also possible to prevent functions from centralizing to the processing unit of upper hierarchy level, so that each control unit execute control independently of the processing unit when there is a failure in the processing unit of upper hierarchy level. As a result, a failure sensing device of a vehicle control system that can, when sensing a failure occurring in a calculation unit (processing unit) connected through a network, accurately sense the failure without incurring undue load concentration can be provided. It noted that examples of the processing unit may include a DSS (Driving Support System), a VDM (Vehicle Dynamics Management) and the like.

Preferably, the information is input data for calculation at the processing unit, and the receiving portion receives as a response a calculation result of the input data substituted into a predetermined calculation formula at the processing unit.

According to the present invention, for example input data is output from the control unit of lower hierarchy level to the processing unit of upper hierarchy level. A calculation result of the input data substituted into a predetermined calculation formula at the processing unit of upper hierarchy level is transmitted as a response from the processing unit of upper hierarchy level to the control unit of lower hierarchy level. When the received calculation result is not correct, the control unit of lower hierarchy level can determine that there is a failure in the processing unit of upper hierarchy level.

Further preferably, the control unit further includes a diagnosing portion diagnosing a failure in itself.

According to the present invention, for example, since the control unit of lower hierarchy level senses a failure in itself, it can accurately sense a failure in the processing unit of upper hierarchy level.

Further preferably, the control unit is configured by multiplexed calculating units.

According to the present invention, since the control unit of lower hierarchy level is configured by multiplexed calculating units, the control unit itself is less likely to be involved with a failure, and it can accurately sense a failure in the processing unit of upper hierarchy level.

Further preferably, the control unit further includes a determining portion determining interruption of control in which additional information from the processing unit is reflected, when a failure of the processing unit is sensed by the sensing portion.

According to the present invention, for example, when there is a failure in the processing unit of upper hierarchy level, the control unit of lower hierarchy level can be switched to local control, whereby basic functions of the vehicle can be preserved.

Further preferably, the control unit is configured by a plurality of control units controlling an operation of a vehicle, and the control unit further includes a sensing portion sensing a failure in the processing unit based on a plurality of sensing results from sensing portions included in the plurality of control units.

According to the present invention, for example, the power train system control unit, brake system control unit and steering system control unit of lower hierarchy level sense a failure in the processing unit of upper hierarchy level by respective sensing means. Here, when at least half of the plurality of control units sense a failure in the processing unit, it may be determined that there is a failure in the processing unit. Thus, the reliability in determining a failure in a processing unit can be improved.

Further preferably, priorities as to failure sensing are assigned to the plurality of control units.

According to the present invention, for example, a control unit with smaller control load, or with higher reliability, is given higher priority. Thus, when the sensing means of that control unit senses a failure in the processing unit, this sensing of a failure in the processing unit of upper hierarchy level can be confirmed. In other words, a control unit with higher priority of failure diagnosis is given the right to eventually confirm the failure determination.

Further preferably, control units with smaller control loads are given higher priorities.

According to the present invention, for example, since a control unit with smaller control load can tolerate greater increase in the load of sensing calculation by the sensing means, it can accurately and immediately sense a failure in the processing unit.

Further preferably, units in the vehicle control system are hierarchically configured, and the control unit is arranged hierarchically lower than the processing unit.

According to the present invention, a failure in the processing unit of upper hierarchy level can be sensed from the control unit of lower hierarchy level.

BRIEF DESCRIPTION OF THE DRAWINGS

FIG. 2 is a flowchart indicative of a control configuration of a failure sensing process program executed by a power train control unit and a driving support control unit of the control blocks shown in FIG. 1

FIG. 3 shows control blocks of a vehicle control system according to a modification of an embodiment of the present invention.

BEST MODES FOR CARRYING OUT THE INVENTION

Figure 1:
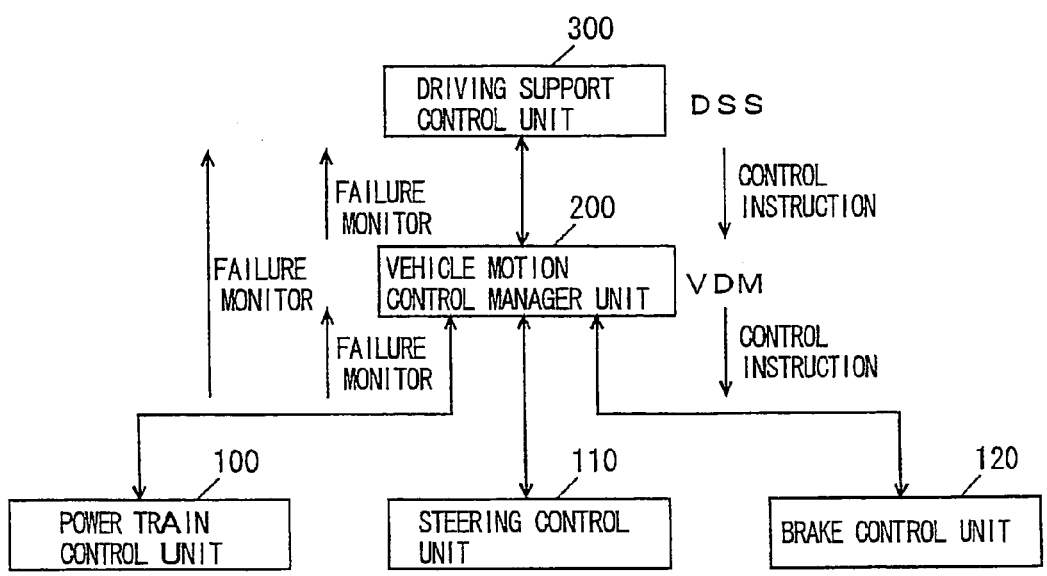
FIG. 1 shows control blocks of a vehicle control system according to an embodiment of the present invention.

An embodiment of the present invention will be described hereinafter with reference to the drawings. The same elements have the same reference characters allotted. Their label and function are also identical. Therefore, detailed description thereof will not be repeated.

FIG. 1 shows a block diagram of a vehicle control system including a failure sensing device according to an embodiment of the present invention. The vehicle control system includes three basic control units of, for example a power train control unit 100 as a power train system control unit, a steering control unit 110 as a steering system control unit, and a brake control unit 120 as a brake system control unit, and a vehicle motion control manager unit 200 and a driving support control unit 300 as processing units.

As shown in FIG. 1, the control system has a control configuration that is hierarchically structured, wherein driving support control unit 300 is arranged in an upper hierarchy level, vehicle motion control manager unit 200 is arranged in a middle hierarchy level, and power train control unit 100, steering control unit 110 and a brake control unit 120 are arranged in a lower hierarchy level. A control instruction function is implemented from the upper hierarchy level toward the lower hierarchy level, and a failure monitor function is implemented from the lower hierarchy level toward the upper hierarchy level. The failure monitor function is a control unit of lower hierarchy level executing a process of sensing whether or not a failure occurs in a processing unit of upper hierarchy, at a predetermined sampling time.

At power train control unit 100 that is the power train system control unit, a control target of the driving system corresponding to accelerator pedal manipulation is generated using a driving basic driver model, based on the accelerator pedal manipulation that is the sensed request of the driver, whereby an actuator is controlled.

At steering control unit 110 that is the steering system control unit, a control target of the steering system corresponding to steering device manipulation is generated using a steering basic driver model, based on the steering device manipulation that is the sensed request of the driver, whereby an actuator is controlled.

At brake control unit 120 that is the brake system control unit, a control target of the brake system corresponding to brake pedal manipulation is generated using a brake basic driver model, based on the brake pedal manipulation that is the sensed request of the driver, whereby an actuator is controlled.

Examples of the processing units may be driving support control unit 300, vehicle motion control manager unit 200 and the like.

Driving support control unit 300 generates information to be used at each control unit based on the environmental information around the vehicle or information related to the driver, and outputs control instruction to each control unit.

Specifically, driving support control unit 300 generates information representing the degree of risk with respect to the vehicle operation property based on the frictional resistance ($\mu$ value) of the road on which the vehicle is running, the outdoor temperature and the like as the environmental information around the vehicle, and/or generates information representing the degree of risk with respect to the manipulation of the driver based on the fatigue level of the driver upon shooting a picture of the driver. Information representing the degree of risk is output to each control unit. Driving support control unit 300 also generates information to implement an automatic cruise function for the automatic drive of vehicle. The information to implement the automatic cruise function is output to each control unit. Such information is processed to be generalized at the driving support control unit so that the information can be used at any of the control units.

Vehicle motion control manager unit 200 generates information to be used at each control units to cause the vehicle to realize a predetermined behavior, and outputs a control instruction to each control unit.

Specifically, vehicle motion control manager unit 200 generates and provides to each control units information to be used at respective control units based on the current dynamic state of the vehicle.

At each control unit, determination is made as to whether or not such information input from the processing units (information other than the request of the driver) is to be reflected in the motion control of the vehicle, and to what extent, if to be reflected. Furthermore, the control target is corrected, and/or information is transmitted among respective control units. Since each control unit operates autonomously, the actuator of the power train, the actuator of brake device and the actuator of steering device are controlled eventually at respective control units based on the eventual driving target, braking target and steering target calculated by the sensed manipulation information of the driver, information input from the processing units, and information transmitted among respective control units.

In a reverse direction relative to the above-described control instruction function directed from the upper control hierarchy level toward the lower control hierarchy level, the failure monitor function directed from the lower control hierarchy level toward the upper control hierarchy level is implemented. In this failure monitor function, power train control unit 100, steering control unit 110 and brake control unit 120 of lower hierarchy level sense whether or not a failure occurs in driving support control unit 300 and/or vehicle motion control manager unit 200 of upper hierarchy level. This failure monitor function will be described referring to the flowchart of FIG. 2. In the following, a case where power train control unit 100 monitors a failure of driving support control unit 300 will be described. The present invention is not restricted to such a case, and it is applicable to any case where a unit of lower hierarchy level monitors a unit of upper hierarchy level.

At step (hereinafter, step is referred to as S) 100, power train control unit 100 determines as to whether or not the vehicle is running. If the vehicle is running (YES at S100), then the process goes to S110. Otherwise (NO at S100), the process ends.

At S110, power train control unit 100 determines as to whether or not the current time point is a failure monitor timing. If the current time point is a failure monitor timing (YES at S110), the process goes to S120. Otherwise (NO at S110), the process ends.

At S120, power train control unit 100 transmits input data for failure monitor calculation to driving support control unit 300.

At S130, power train control unit 100 determines as to whether or not calculation result data is received from driving support control unit 300. If the calculation result data is received from driving support control unit 300 (YES at S130), then the process goes to S150. Otherwise (NO at S130), the process goes to S140.

At S140, power train control unit 100 determines as to whether a predetermined time period has elapsed from the transmission of the input data for failure monitor calculation to driving support control unit 300. If a predetermined time period has elapsed (YES at S140), then the process goes to S170. Otherwise (NO at S140), the process goes back to S130, and calculation result data from driving support control unit 300 is awaited.

At S150, power train control unit 100 determines as to whether or not the calculation result received from driving support control unit 300 is normal. If the calculation result received from driving support control unit 300 is normal (YES at S150), then the process ends. Otherwise (NO at S150), the process goes to S160.

At S160, power train control unit 100 determines that there is a failure in driving support control unit 300 (failure determination), and controls to interrupt a control instruction. In other words, a control instruction transmitted from driving support control unit 300 to power train control unit 100 will not be reflected in control of the power train. In other words, power train control unit 100 controls the vehicle independently of driving support control unit 300. Thereafter, the process ends.

At S170, power train control unit 100 determines that there is a failure in communication, and perform a communication failure process. For example, in such a case, as for a process in a waiting state for receiving a control instruction from driving support control unit 300 in a control program of power train control unit 100, the waiting state for reception of the control instruction is canceled and power train control unit 100 controls the vehicle independently of driving support control unit 300.

At S200, driving support control unit 300 determines as to whether or not input data is received from power train control unit 100. If input data is received from power train control unit 100 (YES at S200), then the process goes to S210. Otherwise (NO at S200), the process goes back to S200.

At S210, driving support control unit 300 calculates a calculation result data substituting the input data into a failure monitor calculation formula stored in advance, using an internal calculation unit.

At S220, driving support control unit 300 transmits the calculation result data to power train control unit 100.

Now, an operation of the failure sensing device of a vehicle control system according to the present embodiment based on the aforementioned structure and flowchart will be described.

While the vehicle is running (YES at S100), at every failure monitor timing (YES at S110), input data for failure monitor calculation is transmitted from power train control unit 100 to driving support control unit 300 (S120). For example, this failure monitor timing is set with intervals of several tens to several hundreds of milliseconds.

Driving support control unit 300 receives the input data, and calculates a calculation result data substituting the input data into a failure monitor calculation formula stored in advance, using an internal calculation unit (S210). The calculation result data is transmitted from driving support control unit 300 to power train control unit 100 (S220).

Before a predetermined time period elapses from the transmission of the input data for failure monitor calculation to driving support control unit 300, power train control unit 100 receives the calculation result from driving support control unit 300 (YES at S130, NO at S140). If the calculation result is not normal (NO at S150), power train control unit 100 determines that there is a failure in driving support control unit 300. Control is executed so as to interrupt a control instruction transmitted from driving support control unit 300 to power train control unit 100 from this time onward.

If power train control unit 100 does not receive the calculation result from driving support control unit 300 before a predetermined time period elapses from the transmission of the input data for failure monitor calculation to driving support control unit 300 (NO at S130, YES at S140), it determines that there is a failure in the communication between power train control unit 100 and driving support control unit 300, and the communication failure process is performed.

As described above, according to the vehicle control system according to the present embodiment, a failure in the driving support control unit and/or vehicle motion control manager unit of upper hierarchy level can be sensed by the power train control unit, steering control unit and brake control unit of the control unit of lower hierarchy level. Therefore, a unit of upper hierarchy level is no more necessary to monitor many control units of lower hierarchy level in a centralized manner, thereby realizing reduction of the load of the units of upper hierarchy level. As a result, when sensing a failure occurring in a unit of upper hierarchy level connected through a network, the failure can accurately be sensed using a unit of lower hierarchy level and without incurring undue load concentration.

If there is a failure in a control unit of lower hierarchy level itself, which is to sense a failure in a unit of upper hierarchy level, a failure cannot be sensed accurately. Furthermore, as control units of lower hierarchy level correspond to the driving system control unit corresponding to a "running" operation that is the basic operation of the vehicle, the brake system control unit corresponding to a "stop" operation, and the steering system control unit corresponding to a "turning" operation, they must be highly reliable. Therefore, providing a control unit of lower hierarchy level with a function of diagnosing a failure itself, the accuracy of sensing a failure in a unit of upper hierarchy level is improved.

In place of providing the function of diagnosing a failure in itself, the calculation system of a unit may be multiplexed.

Priorities of failure sensing determination can be assigned to the control units of lower hierarchy level, which are the power train system control unit corresponding to a "running" operation that is the basic operation of the vehicle, the brake system control unit corresponding to a "stop" operation, and the steering system control unit corresponding to a "turning" operation, so that the one with smaller calculation load, or with higher reliability, is given higher priority. Thus, when a control unit of high priority senses a failure, this determination result indicative of a failure in the unit of upper hierarchy level can be confirmed since this failure sensing is highly reliable.

When the failure determination result with respect to the unit of upper hierarchy level varies among a plurality of control units, the determination indicative of a failure in the unit of upper hierarchy level may be confirmed if at least half of the control units determine that the failure exists.

Other Modification

FIG. 3 is a block diagram of a vehicle control system corresponding to FIG. 1. As shown in FIG. 3, this vehicle control system is different from the one shown in FIG. 1 and it is configured by three basic control units of a power train control unit 100 as a power train system control unit, a steering control unit 110 as a steering system control unit, and a brake control unit 120 as a brake system control unit, and a vehicle motion control manager unit 200 and driving support control unit 300 as processing units, but it does not have a control hierarchy.

With such a control system also, a program as in the aforementioned embodiment can be executed and the same effect can be attained.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A failure sensing device of a vehicle control system including a control unit generating a control target based on an operation request for controlling a driving state of a vehicle by manipulating a corresponding actuator using the generated control target, and a processing unit connected to said control unit by a network, for generating and providing to said control unit additional information to be used to modify said operation request or said control target, as necessary, at said control unit, wherein
said failure sensing device is provided to said control unit with smaller control load, and includes
an output portion outputting information to said processing unit with greater control load,
a receiving portion receiving a response corresponding to said information from said processing unit, and
a sensing portion sensing a failure in said processing unit based on said information and said response.

2. The failure sensing device according to claim 1, wherein said information is input data for calculation at said processing unit, and
said receiving portion receives as a response a calculation result of said input data substituted into a predetermined calculation formula at said processing unit.

3. The failure sensing device according to claim 1, wherein said control unit further includes a diagnosing portion diagnosing a failure in itself.

4. The failure sensing device according to claim 1, wherein said control unit is configured by multiplexed calculating units.

5. The failure sensing device according to claim 1, wherein said control unit further includes a determining portion determining interruption of control in which additional information from said processing unit is reflected, when a failure of said processing unit is sensed by said sensing portion.

6. The failure sensing device according to claim 1, wherein said control unit is configured by a plurality of control units controlling an operation of a vehicle, and
said control unit further includes a sensing portion sensing a failure in said processing unit based on a plurality of sensing results from sensing portions included in said plurality of control units.

7. The failure sensing device according to claim 6, wherein priorities as to failure sensing are assigned to said plurality of control units.

8. The failure sensing device according to claim 7, wherein control units with smaller control loads are given higher priorities.

9. A failure sensing device of a vehicle control system including a control unit generating a control target based on an operation request for controlling a driving state of a vehicle by manipulating a corresponding actuator using the generated control target, and a processing unit connected to said control unit by a network, for generating and providing to said control unit additional information to be used to modify said operation request or said control target, as necessary, at said control unit, wherein
said failure sensing device is provided to said control unit with smaller control load, and includes
an output portion outputting information to said processing unit with greater control load,
a receiving portion receiving a response corresponding to said information from said processing unit and
a sensing portion sensing a failure in said processing unit based on said information and said response, wherein
units in said vehicle control system are hierarchically configured, and
said control unit is arranged hierarchically lower than said processing unit.

10. A failure sensing device of a vehicle control system including a control unit generating a control target based on an operation request for controlling a driving state of a vehicle by manipulating a corresponding actuator using the generated control target, and a processing unit connected to said control unit by a network, for generating and providing to said control unit additional information to be used to modify said operation request or said control target, as necessary, at said control unit wherein
said failure sensing device is provided to said control unit with smaller control load, and includes
outputting means for outputting information to said processing unit with greater control load,
receiving means for receiving a response corresponding to said information from said processing unit, and
sensing means for sensing a failure in said processing unit based on said information and said response.

11. The failure sensing device according to claim 10, wherein
said information is input data for calculation at said processing unit, and
said receiving means includes means for receiving as a response a calculation result of said input data substituted into a predetermined calculation formula at said processing unit.

12. The failure sensing device according to claim 10, wherein
said control unit further includes diagnosing means for diagnosing a failure in itself.

13. The failure sensing device according to claim 10, wherein
said control unit is configured by multiplexed calculating units.

14. The failure sensing device according to claim 10, wherein
said control unit further includes means for determining interruption of control in which additional information from said processing unit is reflected, when a failure of said processing unit is sensed by said sensing means.

15. The failure sensing device according to claim 10, wherein
said control unit is configured by a plurality of control units controlling an operation of a vehicle, and
said control unit further includes means for sensing a failure in said processing unit based on a plurality of sensing results from sensing means included in said plurality of control units.

16. The failure sensing device according to claim 15, wherein priorities as to failure sensing are assigned to said plurality of control units.

17. The failure sensing device according to claim 16, wherein control units with smaller control loads are given higher priorities.

18. A failure sensing device of a vehicle control system including a control unit generating a control target based on an operation request for controlling a driving state of a vehicle by manipulating a corresponding actuator using the generated control target, and a processing unit connected to said control unit by a network, for generating and providing to said control unit additional information to be used to modify said operation request or said control target, as necessary, at said control unit wherein
said failure sensing device is provided to said control unit with smaller control load, and includes
outputting means for outputting information to said processing unit with greater control load,
receiving means for receiving a response corresponding to said information from said processing unit, and
sensing means for sensing a failure in said processing unit based on said information and said response, wherein
units in said vehicle control system are hierarchically configured, and
said control unit is arranged hierarchically lower than said processing unit.

* * * * *